United States Patent
Lee et al.

(10) Patent No.: US 8,287,636 B2
(45) Date of Patent: Oct. 16, 2012

(54) PEARLESCENT PIGMENTS WITH LARGE ASPECT RATIO AND A METHOD OF THEIR PREPARATION

(75) Inventors: Jung Min Lee, Daejeon (KR); Jeong Kwon Suh, Daejeon (KR); Byung Ki Park, Daejeon (KR); Dong Uk Choe, Daejeon (KR); Gil Wan Chang, Cheongju-si (KR); Kwang Su Lim, Cheongju-si (KR); Sung Yun Jo, Chungcheongbuk-do (KR); Kwang Choong Kang, Cheongju-si (KR)

(73) Assignees: Korea Research Institute of Chemical Technology, Daejeon (KR); CQV Co., Ltd., Chungcheongbuk-Do (KR)

( * ) Notice: Subject to any disclaimer, the term of this patent is extended or adjusted under 35 U.S.C. 154(b) by 754 days.

(21) Appl. No.: 12/439,164

(22) PCT Filed: Jul. 24, 2007

(86) PCT No.: PCT/KR2007/003556
§ 371 (c)(1),
(2), (4) Date: Feb. 26, 2009

(87) PCT Pub. No.: WO2008/026829
PCT Pub. Date: Mar. 6, 2008

(65) Prior Publication Data
US 2009/0320719 A1     Dec. 31, 2009

(30) Foreign Application Priority Data
Aug. 28, 2006 (KR) .................. 10-2006-0081600

(51) Int. Cl.
C09C 1/04 (2006.01)
C09C 1/00 (2006.01)
C04B 14/00 (2006.01)
(52) U.S. Cl. .......... 106/426; 106/415; 106/419; 106/425
(58) Field of Classification Search .................. 106/426, 106/415, 419, 425
See application file for complete search history.

(56) References Cited

U.S. PATENT DOCUMENTS
3,840,381 A * 10/1974 Watanabe ...................... 106/415
6,508,876 B1 * 1/2003 Bernhardt et al. ............ 106/415

FOREIGN PATENT DOCUMENTS
| JP | 07-331110 A | 12/1995 |
| JP | 2003-213156 A | 7/2003 |
| JP | 2003-277646 A | 10/2003 |
| JP | 2005-048133 A | 2/2005 |
| WO | WO 2004/052999 A | 6/2004 |

* cited by examiner

Primary Examiner — Shuangyi Abu Ali
(74) Attorney, Agent, or Firm — Frommer Lawrence & Haug, LLP; Ronald R. Santucci

(57) ABSTRACT

The present invention relates to a pearlescent pigment with large aspect ratio and a method of their preparation, and particularly to pearlescent pigments prepared by coating a metal or metal precursor on the flaky alpha-alumina crystals obtained by using an aluminum precursor aqueous solution and a zinc precursor aqueous solution as main ingredients. The crystals herein has an average particle thickness of 0.5 μm or less, an average particle diameter of 15 μm or higher and a large aspect ratio of 50 or higher, thereby being superior in gloss. The crystals show metal colors and interference colors of silver, gold, red, purple, blue and green.

6 Claims, 2 Drawing Sheets

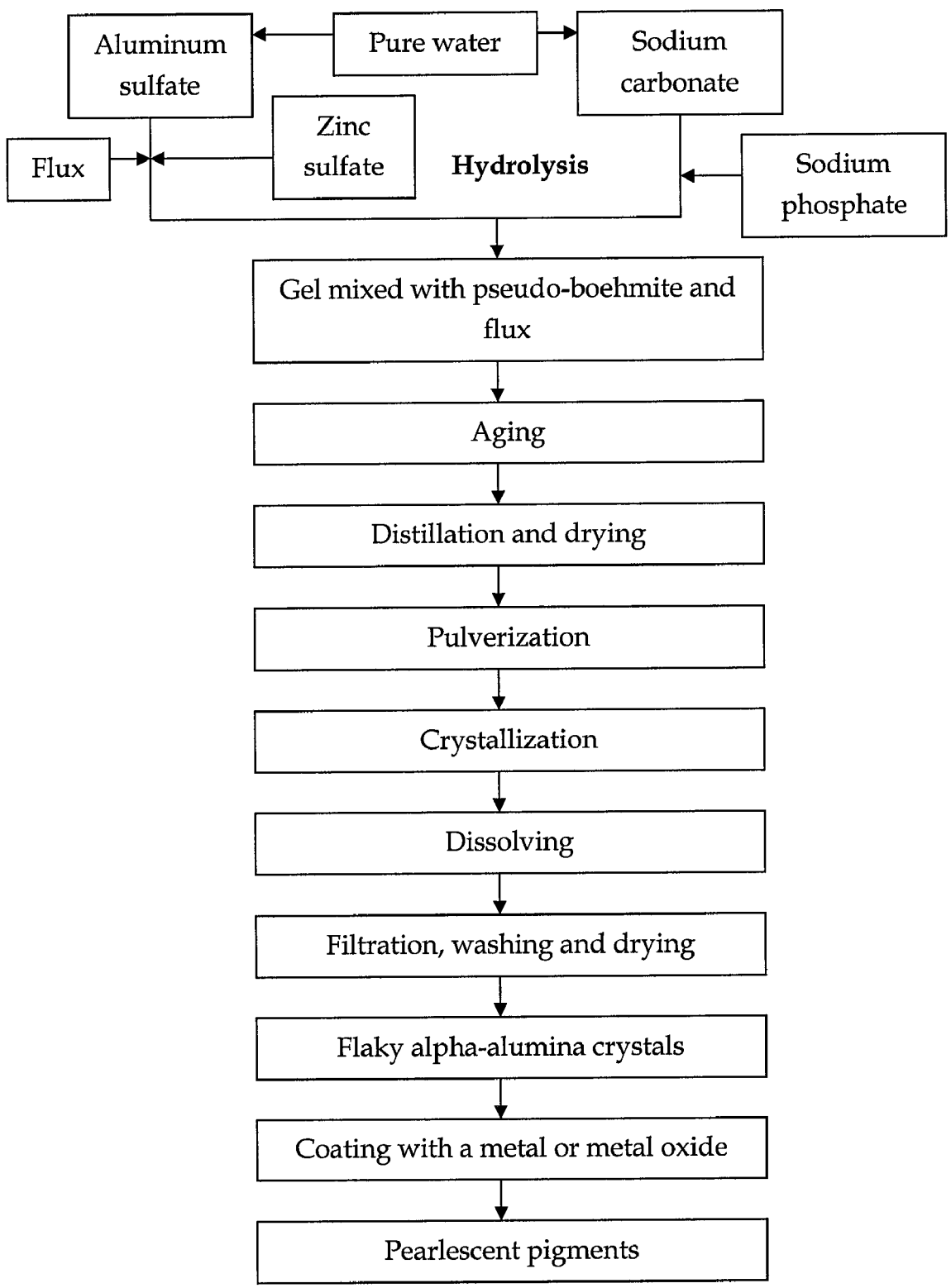
[Figure 1]

[Figure 2]
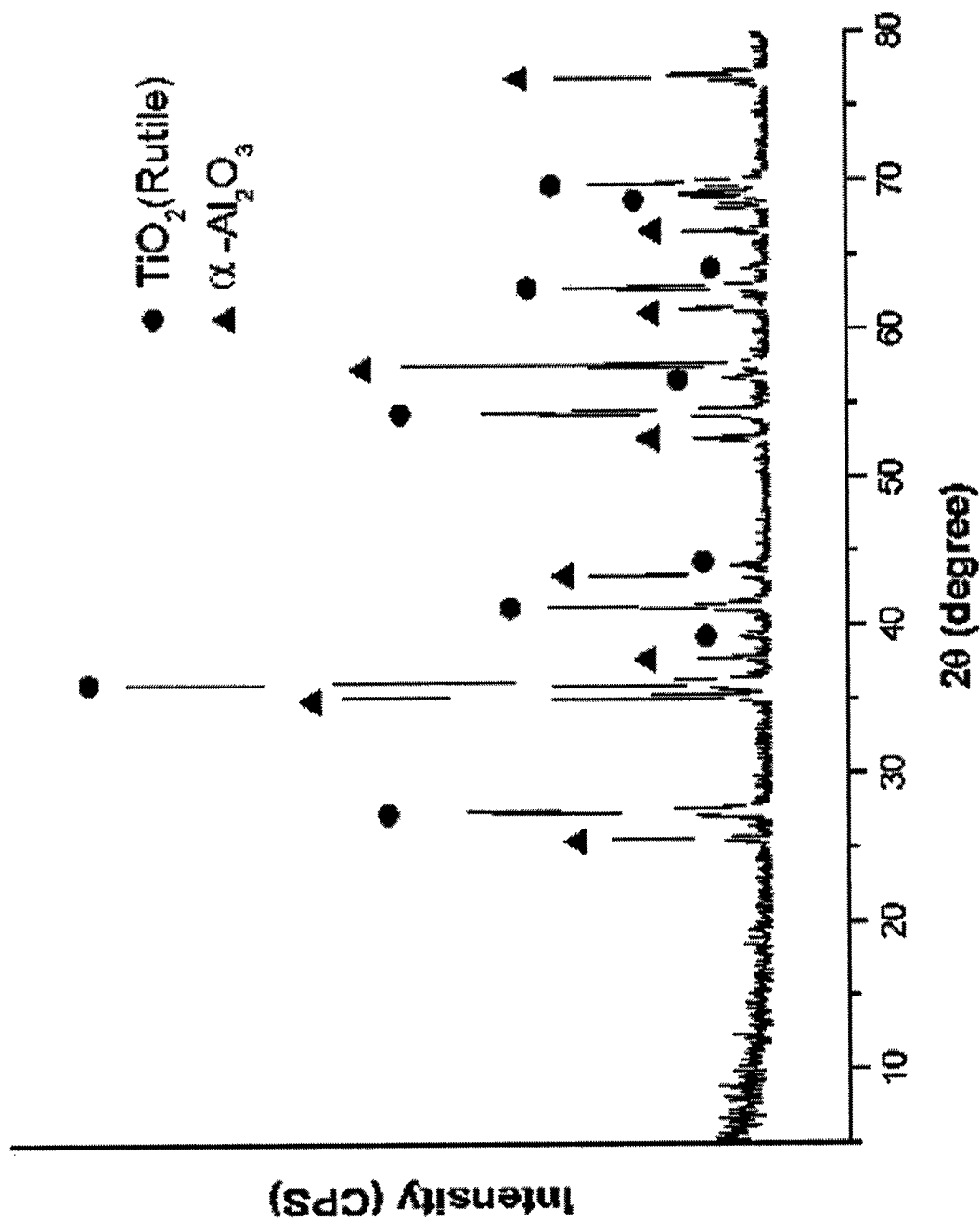

PEARLESCENT PIGMENTS WITH LARGE ASPECT RATIO AND A METHOD OF THEIR PREPARATION

This application is a 371 of PCT/KR2007/003556 filed on Jul. 24, 2007, published on Mar. 6, 2008 under publication number WO 2008/026829 A1 which claims priority benefits from South Korean Patent Application Number 10-2006-0081600 filed Aug. 28, 2006, the disclosure of which is incorporated herein by reference.

TECHNICAL FIELD

The present invention relates to a pearlescent pigment with large aspect ratio and a method of their preparation, and particularly to pearlescent pigments prepared by coating a metal or metal precursor on the flaky alpha-alumina crystals obtained by using an aluminum precursor aqueous solution and a zinc precursor aqueous solution as main ingredients. The crystals herein has an average particle thickness of 0.5 μm or less, an average particle diameter of 15 μm or higher and a large aspect ratio of 50 or higher, thereby being superior in gloss. The crystals show metal colors and interference colors of silver, gold, red, purple, blue and green.

BACKGROUND ART

Important properties in pearlescent pigments as a substrate are particle size, shape, surface property and refractive index. That is, uniform particle size is necessary to achieve clear colors because the ratio of reflected light to transmitted light are different between large-sized particles and small-sized particles. Further, the particle size is closely related to the wavelength of light, and greatly affects the tinting strength of pearlescent pigments.

Surface area increases with the decrease of the particle size, thereby increasing tinting strength and reflectivity and thus making color clear. However, it is difficult to uniformly coat small-sized particles with a metal or metal oxide, and the small size may decrease the effect of light interference and deteriorate the pearl gloss. Therefore, particles are preferred to have sufficiently uniform size for expression of various pearl gray colors.

The substrate in pearlescent pigments should also be transparent particles that have uniform thickness and smooth surface because these properties affect the expression of pearl gray color such as tinting strength and hiding power. When the thickness of particles is not uniform or surface is not smooth, most light reflects or scatters on the surface. Agglomeration of particles and non-uniform thickness also inhibit the expression of various pearl gray colors when the particles are coated with a metal or metal oxide.

Therefore, to be useful as a substrate for pearlescent pigments, flaky alpha-alumina crystals should be transparent flaky particles that have a thickness of 0.5 μm or less; an average particle size of 15-25 μm, while having a very smooth surface without causing agglomeration.

Examples of the conventional substrate of pearlescent pigments include lead carbonate, bismuth oxychloride (BiOCl) and natural or synthetic mica. The mica is also used as a reinforcing agent for improving the ductility and mechanical property of ceramic material or as an additive for improving thermal conductivity.

Meanwhile, the flaky alumina substrate has been conventionally prepared by using a hydrothermal method or by using titanium dioxide as additives for being used as a substrate of pearlescent pigments.

The hydrothermal method has problems of small particle size and low large aspect ratio. The latter comprises no aging process and has problems of small large aspect ratio and non-uniform particle size and dispersity despite superior properties in a substrate of pearlescent pigments.

Therefore, aluminum solution is hydrolyzed into pseudo-boehmite normally according to solution chemistry. The pseudo-boehmite undergoes phase transition into gamma-alumina ($\gamma\text{-}Al_2O_3$) at above 400° C. Hexagonal flaky crystals may be formed by changing the gamma-alumina ($\gamma\text{-}Al_2O_3$) into alpha-alumina in a molten salt solution by means of heat treatment to 850° C.

The flaky alpha-alumina crystals should have a thin and uniform plane, a large aspect ratio (=diameter/thickness) of 50 or higher along with transparency so that it may show a pearlescent gloss effect of various colors when coated with a metal or metal oxide.

However, the conventional flaky crystals have a relatively low large aspect ratio, and thus show unsatisfactory gloss caused by interference colors when coated with a metal and metal oxide.

The present inventors have filed a patent application directed to flaky alpha-alumina crystals comprising aluminum oxide and zinc oxide as an essential ingredient and a method of their preparation as a result of search on flaky alpha-alumina crystals with large aspect ratio [Publication of Korean patent application No. 2005-25126]. Thus prepared flaky alpha-alumina crystals have a thickness of 0.1-0.5 μm, a diameter of 15-25 μm and a large aspect ratio of 50-250.

DISCLOSURE

Technical Problem

Technical Solution

The present inventors have exerted extensive researches to overcome the aforementioned problems of the conventional flaky alumina crystals, which is widely used as substrate in pearlescent pigments. As a result, a gel is prepared by means of hydrolysis of main ingredients (aluminum precursor aqueous solution and zinc precursor aqueous solution), followed by aging and drying processes. Then, novel flaky alpha-alumina crystals with an average thickness of 0.5 μm or less, an average diameter of 15 μm or higher and a large aspect ratio of 50 or higher are prepared by crystallizing thus obtained gel by molten salt method, and by coating a metal or metal precursor on the crystals. Further, the present invention has been completed based on the finding that various pearl gray colors may be obtained depending on the thickness of the coating layer and that the coating layer is superior in gloss.

Therefore, the present invention aims to provide pearlescent pigments prepared by coating a metal or metal precursor on novel flaky alpha-alumina crystals comprising aluminum oxide and zinc oxide as a main ingredient, and a method of their preparation.

Advantageous Effects

DESCRIPTION OF DRAWINGS

FIG. 1 shows a process of preparing a pearlescent pigment according to an embodiment of the present invention.

FIG. 2 shows an X-ray diffraction pattern of a pearlescent pigment prepared according to an embodiment of the present invention (Example 1).

BEST MODE

The present invention relates to a pearlescent pigment comprising a flaky alumina crystal coated with a metal or a metal precursor particle, wherein the flaky alumina crystal comprises an aluminum oxide and a zinc oxide in a weight ratio of 100:0.1-5 as a main ingredient.

Further, the present invention relates to a process of preparing pearlescent pigments, comprising:
(a) preparing an aqueous metal precursor solution by mixing a precursor aqueous solution comprising 0.1-5 weight parts of a zinc precursor with an aluminum precursor aqueous solution comprising an aqueous flux relative to 100 weight parts of the aluminum precursor;
(b) preparing a mixed gel by titrating the aqueous metal precursor solution with an aqueous sodium salt solution to pH 6.0-7.5, followed by hydrolysis;
(c) aging the mixed gel at 60-100° C. for 5-30 hours;
(d) drying the aged mixed gel at 60-200° C. for 5-30 hours;
(e) preparing a cake mixed flaky alpha-alumina crystals and flux by crystallizing the dried mixed gel at 850-1,300° C. for 1-8 hours;
(f) preparing an alpha-alumina crystal by cooling the cake to room temperature, removing the flux by dissolving and filtering the cake, dispersing the filtrate in 0.1-30% sulfuric acid solution at 20-90° C., followed by filtration, washing and drying; and
(g) forming a coating layer on the surface of the crystal by adding an acid to aqueous suspension of the alpha-alumina crystal to adjust the pH to 1.0-3.0 and by adding 30-60 weight parts of a metal or a metal precursor and 30-65 weight parts of an alkaline aqueous solution relative to 100 weight parts of the crystal, followed by calcination.

Hereunder is provided a detailed description of the present invention.

The present invention relates to flaky alpha-alumina crystals comprising aluminum oxide and zinc oxide at a predetermined weight ratio as a main ingredient, where the crystals are coated with nano particles of metal or metal oxide. The zinc oxide existing on the surface of aluminum crystals decreases the thickness and accelerates the particle growth particles while inhibiting the agglomeration. Therefore, the used flaky alpha-alumina crystals have an average particle thickness of 0.5 μm or less, preferably 0.1-0.5 μm, more preferably 0.15-0.22 μm; an average particle size of 15 μm or higher, preferably 15-40 μm, more preferably 18-22 μm; and a large aspect ratio of 50 or higher, preferably 50-250, more preferably 60-100, thereby enabling to show various colors in pearlescent pigments depending on the thickness of the coating layer.

FIG. 1 illustrates a process of the present invention. The present invention relates to pearlescent pigments, which are prepared by coating a metal or metal precursor on predetermined flaky alumina crystals. The flaky alumina crystals are disclosed in Korean patent publication No. 2005-25126 filed by the present inventors.

First, an aqueous metal precursor solution is prepared by mixing aluminum precursor aqueous solution comprising aqueous flux with zinc precursor aqueous solution.

Any conventional aluminum precursor may be used as the aluminum precursor in the present invention. Examples of the aluminum precursor include without limitation an acid salt, a halide and an oxide of aluminum, specifically aluminum sulfate, aluminum nitrate and aluminum chloride. Further, any conventional zinc precursor may be used as the zinc precursor in the present invention. Examples of the zinc precursor include without limitation an acid salt, a halide and an oxide of zinc, specifically zinc sulfate, zinc nitrate and zinc chloride. In the present invention, aluminum sulfate is selected considering its properties relating to hydrolysis, chemical affinity with flux and easy separation from flaky crystals in water after crystallization. As another precursor, zinc sulfate is selected considering chemical affinity with the aluminum sulfate and superiority in preventing the thickness decrease and agglomeration of flaky crystals. The zinc sulfate oxidizes into zinc oxide at a temperature of 300° C. or higher. The zinc oxide attaches to crystal surface of flaky alpha-alumina during the crystallization. Thus, the growth of a plane with relatively high surface energy, i.e. (0001) plane, is inhibited, while the growth of planes with relatively lower surface energy, i.e. ($2\bar{1}\bar{1}0$), ($11\bar{2}0$), ($\bar{1}2\bar{1}0$) planes, is promoted (epitaxial growth).

Therefore, the growth in the thickness direction is inhibited while the growth in the diameter direction is promoted, thus forming flaky alumina crystals having relatively thin thickness and a large size. Further, flaky alpha-alumina crystals having various large aspect ratios may be prepared because the zinc oxide may have various thickness and size depending on the used amount.

The aluminum precursor and the zinc precursor are preferred to be used in the form of aqueous solution. The concentration is preferably in the range of 15-35% and 20-50%, respectively. Concentration outside the aforementioned range may cause problems in conducting hydrolysis and drying, preventing agglomeration of flaky alpha-alumina crystal and controlling size and large aspect ratio.

The zinc precursor is preferably used in the amount of 0.05-5 weight parts relative to 100 weight parts of aluminum precursor. When the amount is less than 0.05 weight parts, it may be difficult to inhibit the agglomeration of flaky alpha-alumina crystals and the large aspect ratio may be decreased due to the increase in thickness. When the amount is more than 5 weight parts, the zinc oxide may act as impurity and generate heterogeneous nucleus during the crystallization, thereby producing crystals having small size.

Further, the aqueous flux changes the solid phase into a liquid phase, where nucleation and growth are relatively easy. Mechanism of nucleation and growth in molten salt are as follows. Solute molecules or atoms agglomerate to form seeds, followed by nucleation and growth under the control of surface free energy and volume free energy.

The nucleation of flaky alpha-alumina crystals may be divided into a homogeneous nucleation and a heterogeneous nucleation. The homogeneous nucleation is caused by the diffusion of atoms depending on the super-saturation of solution in a molten salt solution. The heterogeneous nucleation happens on a container comprising solution or on the surface of solid or impurities.

The nucleation of flaky alpha-alumina crystals proceeds heterogeneously as in the nucleation of other materials. The activation energy is relatively lower in heterogeneous nucleation because the interfacial energy is decreased when the nucleation happens on solid surface such as crucible surface and impurity particle surface.

The activation energy in heterogeneous nucleation varies greatly depending on wetting angle of solution on solid surface, and the nucleation may become easier at low wetting angle.

However, nucleation may not be easily caused although wetting angle is small because chemical affinity or physical property on the surface is a more important factor than the wetting angle. Therefore, nucleation may be facilitated if there are fine pores or grooves on the solid surface or chemical affinity between nucleus and the solid surface.

There are two types of heterogeneous nucleation. One is the nucleation and growth on crucible surface and impurity particle surface, and the other is growth in a certain direction called an epitaxial direction.

Any conventional aqueous flux may be used in the present invention. The aqueous flux is superior in chemical affinity with aluminum precursor, easily forms a molten salt even at a relatively low temperature and may be easily dissolved in water after crystallization. Examples of the aqueous flux include without limitation sodium sulfate, potassium sulfate, potassium hydrogen sulfate, sodium borate, potassium nitrate and potassium hydroxide. The aqueous flux is preferably used in the amount of 80-120 weight parts relative to 100 weight parts of aluminum precursor. When the amount is less than 80 weight parts, the formation of molten salt and the growth of flaky alpha-alumina crystals may be difficult. When the amount is more than 120 weight parts, the size and the large aspect ratio of flaky alpha-alumina crystals may decrease.

As a next step, the aqueous metal precursor solution is titrated with sodium salt aqueous solution to pH 6.0-7.5, followed by hydrolysis, thereby proving mixed gel.

Any conventional sodium salt aqueous solution may be used in the present invention. Examples of the sodium salt include without limitation sodium carbonate, sodium bicarbonate, sodium hydroxide, sodium phosphate and a mixture thereof.

The mixed gel is aged and dried. The aging is conducted at 60-100° C. for 5-30 hours. When the temperature is lower than 60° C., the growth of pseudo-boehmite contained in the mixed gel may be difficult. When the temperature is higher than 100° C., the morphological change of pseudo-boehmite may be caused by hydrothermal reaction, and the formation of flaky crystals may be difficult. When the time is less than 5 hours, homogeneous mixed gel may not be obtained, and the growth of pseudo-boehmite is inhibited, thereby causing serious agglomeration of flaky alpha-alumina crystals. When the time is more than 30 hours, flaky alpha-alumina crystals having large thickness may be obtained due to excessive growth of pseudo-boehmite. Nucleation and growth of pseudo-boehmite and homogeneous dispersion of the mixed gel may be achieved by conducting the aforementioned mixing, hydrolysis and aging processes. These processes facilitate the formation of flaky crystals caused by the agglomeration of needle-shaped gamma-alumina during the crystallization, and also place zinc oxide on the surface of flaky alpha-alumina crystals, thereby causing the decrease in thickness and promoting the growth of particles, while preventing the agglomeration of particles.

The drying is conducted at 60-200° C. for 5-30 hours. When the temperature is lower than 60° C., the drying may not be sufficient. When the temperature is higher than 200° C., hard dried gel may be formed due to excessive drying shrinkage of the mixed gel, and heterogeneous flaky crystals may be formed due to the agglomeration of pseudo-boehmite.

In the drying process, water is sufficiently removed, thereby preventing the catalytic activity of water during the crystallization.

The dried mixed gel is crystallized at 850-1,300° C. for 1-8 hours. When the temperature is lower than 850° C., the formation of flaky alpha-alumina crystals may be difficult. When the temperature is higher than 1,300° C., sulfur constituting the flux may be separated, and the difficulty in maintaining molten salt may cause the agglomeration of flaky crystals and also increase the production cost.

It is preferred that flaky crystals having sufficient size are formed by the agglomeration of needle-shaped particles before the phase transition to alpha-alumina so that homogeneous molten salt without temperature gradient may be formed by the crystallization.

The crystallized cake is cooled, washed and dried according to the conventional method. In the present invention, flaky alpha-alumina crystals are prepared by cooling the cake to room temperature and dispersing the cake at 20-90° C. with 0.1-30%, preferably 1-10% sulfuric acid solution, followed by filtration, washing and drying processes. When the concentration of the sulfuric acid solution is lower than 0.1%, the dispersion of the flaky alpha-alumina crystals may be difficult. When the concentration is higher than 30%, the dispersing effect may level off while increasing the cost for discharging waste solution.

Thus prepared flaky alpha-alumina crystals, which comprises aluminum oxide and zinc oxide as a main ingredient at a predetermined weight ratio, have an average particle thickness of 0.5 µm or less, preferably 0.1-0.5 µm, more preferably 0.15-0.22 µm; an average particle size of 15 µm or higher, preferably 15-40 µm, more preferably 18-22 µm; and a large aspect ratio of 50 or higher, preferably 50-250, more preferably 60-100.

The present invention relates to pearlescent pigments prepared by coating a metal or metal precursor on thus obtained flaky alpha-alumina crystals. The pigments herein show metal colors and various interference colors of silver, gold, red, purple, blue, green.

Metal or metal oxide coating layer is formed on the surface of crystals by adding an acid into aqueous suspension of the alpha-alumina crystals to adjust the pH to 1.0-3.0, and adding metal or metal precursor along with alkaline hydroxide, followed by stirring, filtration, washing, drying and calcination processes, thereby finally providing the pearlescent pigments according to the present invention.

The pH is preferred to be within the aforementioned range for facilitating efficient hydrolysis. When the pH is lower than 1.0, the coating on the alpha-alumina particle may be difficult. When the pH is higher than 3.0, excessive agglomeration of metal precursor may be generated.

Examples of the metal or metal precursor include a metal such as gold, silver, copper, titanium, tin and iron; an acid salt of the metal; a halide of the metal; and an oxide of the metal. Specific examples include gold(I) chloride, gold(II) chloride, silver chloride, silver nitrate, copper sulfate, copper nitrate, copper chloride, titanium sulfate, titanium nitrate, titanium chloride, tin sulfate, tin nitrate, tin chloride, iron sulfate, iron nitrate, iron chloride and a mixture thereof.

This metal or metal precursor is used in the amount of 30-60 weight parts relative to 100 weight parts of the alpha-alumina crystals. When the amount is less than 30 weight parts, gloss and interference color may not be satisfactory. When the amount is more than 60 weight parts, gloss may not be satisfactory and turbid interference color may be obtained.

Further, the alkaline aqueous solution, which is added at the same time with the metal or metal precursor, is used for the effective coating of the metal or metal precursor on the flaky alumina particles. Examples of the alkaline material include sodium hydroxide, potassium hydroxide and ammonia. This alkaline aqueous solution is used in the amount of 30-65 weight parts relative to 100 weight parts of alpha-alumina crystals. When the amount is less than 30 weight parts, the coating of metal or metal precursor may be slow. When the amount is more than 65 weight parts, hydrolysis may be excessively accelerated, thereby causing too much agglomeration.

The calcination is conducted at 700-1,000° C. for 30-60 minutes. When the temperature is less than 700° C., the formation of metal oxide may not be sufficient. When the temperature is higher than 1,000° C., cracks may be caused on the surface of metal oxide, thus deteriorating quality.

Thus prepared pearlescent pigments show metal colors and various interference colors of silver, gold, red, purple, blue and green depending on the amounts of metal or metal precursor and alkaline hydroxide together with superior gloss.

MODE FOR INVENTION

The present invention is described more specifically by the following Examples. Examples herein are meant only to illustrate the present invention, and they should not be construed as limiting the scope of the claimed invention.

PREPARATORY EXAMPLES

Preparation of Flaky Alpha-Alumina

Preparatory Example 1

A homogeneous mixture solution was prepared by mixing 670 g of aluminum sulfate ($Al_2(SO_4)_3 \cdot 18H_2O$), 345 g of sodium sulfate ($Na_2SO_4$), 280 g of potassium sulfate ($K_2SO_4$) and 1.5 g of 34% zinc sulfate ($ZnSO_4 \cdot 7H_2O$) aqueous solution in a reactor (5 L) containing 1,900 mL of purified water at 65° C. Alkaline solution was prepared by dissolving 324 g of sodium carbonate ($Na_2CO_3$) and 2.7 g of sodium phosphate (($NaPO_3)_6$) in 900 mL of distilled water at 65° C. A gel mixed with pseudo-boehmite and flux was prepared by titrating the aluminum sulfate mixture solution (65° C.) while stirring with the alkaline solution at the rate of 25 mL/min to adjust the final pH to 6.8. The mixed gel was aged at 90° C. for 20 hours, vacuum-distilled at 60° C., and dried at 110° C. for 20 hours. Flaky alpha-alumina crystals were prepared by pulverizing the dried mixed gel to about less than 5 mm, and conducting crystallization in an alumina crucible (2 L) at 1,200° C. for 7 hours. The flux was separated from the flaky alpha-alumina crystals by cooling the crucible to room temperature and dissolving the flux with warm water (60° C.), followed by filtration. The crystals were completely dispersed by placing the separated flaky alpha-alumina crystals in a reactor (5 L) along with 3 L of 10% sulfuric acid solution, and stirring the mixture at 60° C. for 48 hours.

The dispersed solution was filtered, washed and dried at 100° C., thus providing transparent flaky alpha-alumina particles having an average particle thickness of 0.25 μm, an average particle size of 20 μm. Atomic analysis shows that 0.1 weight parts of zinc oxide was contained.

Preparatory Example 2

Transparent flaky alpha-alumina crystals were prepared same as in Example 1 except that 3 g of 34% zinc sulfate was used.

The flaky alpha-alumina crystals were ascertained to have an average particle thickness of 0.22 μm and an average particle size of 18.3 μm. Atomic analysis shows that 0.2 weight parts of zinc oxide was contained.

EXAMPLES

Preparation of Pearlescent Pigments

Example 1

Flaky alpha-alumina particles (100 g) prepared in Preparatory Example 1 was suspended in deionized water (2 L), and the temperature was elevated to 70° C. Chloric acid (5%) was added to adjust the pH to 2, and stirred for 30 minutes. $TiO(OH)_2$ coating layer was formed on the surface of the alpha-alumina particles by adding 40% $TiOCl_2$ and sodium hydroxide solution. As the added amount of the $TiOCl_2$ and the sodium hydroxide solution increases, colors changed to interference colors of silver color (75 nm), gold color (110 nm), red (130 nm), purple (138 nm), blue (150 nm) and green (180 nm). When a desired interference color was obtained, the addition of $TiOCl_2$ and sodium hydroxide solution was interrupted, followed by agitation for more than 10 minutes. After the filtration, washing and drying, calcination was conducted at 800° C., thereby providing a titanium dioxide layer of Anatase structure on the surface of the flaky alpha-alumina particles.

Example 2

Flaky alpha-alumina particles (100 g) prepared in Preparatory Example 2 was suspended in deionized water (2 L), and the temperature was elevated to 70° C. Chloric acid (5%) was added to adjust the pH to 2, and stirred for 30 minutes. $TiO(OH)_2$ coating layer was formed on the surface of the alpha-alumina particles by adding 60 mL of 5% $SnCl_4 \cdot 5H_2O$ solution and sodium hydroxide solution simultaneously, followed by agitation for 30 minutes and addition of 40% $TiOCl_2$ and sodium hydroxide solution. As the coating thickness increases with the added amount of the $TiOCl_2$ and the sodium hydroxide solution, colors changed to interference colors of silver color (78 nm), gold color (115 nm), red (133 nm), purple (141 nm), blue (155 nm) and green (187 nm). When a desired interference color was obtained, the addition of $TiOCl_2$ and sodium hydroxide solution was interrupted, followed by agitation for more than 10 minutes. After the filtration, washing and drying, calcination was conducted at 800° C., thereby providing a titanium dioxide layer of Rutile structure on the surface of the flaky alpha-alumina particles.

Example 3

Flaky alpha-alumina particles (100 g) prepared in Preparatory Example 1 was suspended in deionized water (2 L), and the temperature was elevated to 70° C. Chloric acid (5%) was added to adjust the pH to 2, and stirred for 30 minutes. $TiO(OH)_2$ coating layer was formed on the surface of the alpha-alumina particles by adding 60 mL of 5% $SnCl_4 \cdot 5H_2O$ solution and sodium hydroxide solution. $TiOCl_2$ and sodium hydroxide solution were added until gold color was obtained, followed by agitation for more than 30 minutes. Sodium hydroxide aqueous solution is added to adjust the pH to 3. Ferric chloride solution was added until the desired color (pearl gray) was obtained, followed by filtration, washing and drying. Calcination was conducted at 900° C., thereby providing a coating layer of titanium dioxide and ferric oxide (125 nm) on the surface of the flaky alpha-alumina particles.

Example 4

Flaky alpha-alumina particles (100 g) obtained in Preparatory Example 2 was suspended in deionized water (2 L), and the temperature was elevated to 70° C. Chloric acid (5%) was added to adjust the pH to 3, and stirred for 30 minutes. Sodium hydroxide aqueous solution was added to maintain the pH value. Ferric chloride solution was added until the desired color (pearl gray) was obtained, followed by filtration, washing and drying. Calcination was conducted at 900° C., thereby providing a ferric oxide layer on the surface of the flaky alpha-alumina particles.

Example 5

Flaky alpha-alumina particles (100 g) obtained in Preparatory Example 1 was suspended in deionized water (2 L), and the temperature was elevated to 70° C. Chloric acid (5%) was added to adjust the pH to 1-3, and stirred for 30 minutes. After 10% HAuCl$_4$.xH$_2$O solution (30 mL) was added, and the mixture was stirred for 30 minutes. The mixture was titrated with 10% NaBH$_4$ (250 g) at a constant rate, and was filtered, washed and dried, thereby providing gold coating on the surface of the flaky alpha-alumina particles.

Example 6

Flaky alpha-alumina particles (100 g) obtained in Preparatory Example 1 was suspended in deionized water (2 L), and the temperature was elevated to 70° C. Chloric acid (5%) was added to adjust the pH to 3, followed by agitation for 30 minutes. After 10% AgNO$_3$ solution (250 mL) was added, the mixture was stirred for 30 minutes, and titrated with 10% NaBH$_4$ (250 g) at a constant rate. After the titration, the mixture was filtered, washed and dried, thereby providing silver coating layer on the surface of the flaky alpha-alumina particles.

Example 7

Flaky alpha-alumina particles (100 g) obtained in Preparatory Example 1 was suspended in deionized water (2 L), and the temperature was elevated to 70° C. Chloric acid (5%) was added to adjust the pH to 2, and the mixture was stirred for 30 minutes. After 10% CuSO$_4$.5H$_2$O solution (150 mL) was added with agitation, and the mixture was titrated with 10% NaBH$_4$ (250 g) at a constant rate. After the titration, the mixture was filtered, washed and dried, thereby providing copper layer on the surface of the flaky alumina particles.

Comparative Examples 1-4

Metal Oxide Coating Layer

As described in Examples 1-4, titanium dioxide layer of Anatase structure, titanium dioxide layer of Rutile structure, titanium dioxide layer, ferrous oxide layer and ferric oxide layer were formed on flaky alpha-alumina crystals having an average diameter of 8.5 μm, an average thickness of 0.3 μm and a large aspect ratio of 20-30.

Comparative Examples 5-7

Metal Coating Layer

As described in Examples 5-7, gold layer, silver layer and copper layer were coated on the same flaky alpha-alumina crystals as in Comparative Example 1.

Experimental Example 1

Thickness, particle size, large aspect ratio and gloss of the pearlescent pigments, which were prepared in Examples 1-7 and Comparative Examples 1-7, were measured, and the results are presented in Table 1. Gloss is measured as follows. Pearlescent pigments (0.3 g) were prepared in Examples 1-7 and Comparative Examples 1-7. The pigments are mixed with nitrocellulose (5 g) having a viscosity of 1200 cps, and the mixture was sufficiently dispersed. The dispersed specimen was placed in a draw down card, and uniformly drawn down by using a doctor applicator (Gape 100 μm). The specimen was sufficiently dried, and 60° specular reflection (gloss) was measured with a gloss sensor (Nippon Denshoku Co., Ltd. PG-1M).

TABLE 1

| Examples | Avg. ptcl. thickness* | Avg. ptcl. size* | Large aspect ratio* (Avg. size/avg. thickness) | Coating gloss degree |
|---|---|---|---|---|
| Ex. 1 | 0.25 μm | 20 μm | 80 | 57.6° |
| Ex. 2 | 0.22 μm | 18.3 μm | 83 | 53.5° |
| Ex. 3 | 0.25 μm | 20 μm | 80 | 47.3° |
| Ex. 4 | 0.22 μm | 18.3 μm | 83 | 54.2° |
| Ex. 5 | 0.25 μm | 20 μm | 80 | 41.5° |
| Ex. 6 | 0.25 μm | 20 μm | 80 | 34.4° |
| Ex. 7 | 0.25 μm | 20 μm | 80 | 39.6° |
| Comp. Ex. 1 | 0.3 μm | 8.5 μm | 28 | 22.1° |
| Comp. Ex. 2 | 0.3 μm | 8.5 μm | 28 | 27.9° |
| Comp. Ex. 3 | 0.3 μm | 8.5 μm | 28 | 28.5° |
| Comp. Ex. 4 | 0.3 μm | 8.5 μm | 28 | 29.2° |
| Comp. Ex. 5 | 0.3 μm | 8.5 μm | 28 | 29.8° |
| Comp. Ex. 6 | 0.3 μm | 8.5 μm | 28 | 27.6° |
| Comp. Ex. 7 | 0.3 μm | 8.5 μm | 28 | 26.3° |

*Alpha-alumina

Various colors were expressed depending on the metal and metal oxide layer in Examples 1-7 and Comparative Examples 1-5. However, Table 1 shows that Examples are superior to Comparative Examples in gloss.

INDUSTRIAL APPLICABILITY

As described above, high quality pearlescent pigments according to the present invention are prepared by coating a metal or metal precursor on flaky alpha-alumina crystals having a thickness of as low as 0.1-0.3 μm; a size of 15 μm or less; a large aspect ratio of 50 or higher, which comprises aluminum oxide and zinc oxide as a main ingredient at a predetermined weight ratio, thereby enabling high gloss and the expression of metal color or various interference colors of silver color, gold color, red, purple, blue, and green.

The invention claimed is:
1. A process of preparing a pearlescent pigment, comprising:
(a) preparing an aqueous metal precursor solution by mixing a precursor aqueous solution comprising 0.1-5 weight parts of a zinc precursor with an aluminum precursor aqueous solution comprising an aqueous flux relative to 100 weight parts of the aluminum precursor;
(b) preparing a mixed gel by titrating the aqueous metal precursor solution with an aqueous sodium salt solution to pH 6.0-7.5, followed by hydrolysis;
(c) aging the mixed gel at 60-100° C. for 5-30 hours to form an aged mixed gel;
(d) drying the aged mixed gel at 60-200° C. for 5-30 hours to form a dried mixed gel;
(e) preparing a crystallized cake comprising flak alpha-alumina crystals and the aqueous flux by crystallizing the dried mixed gel at 850-1,300° C. for 1-10 hours;
(f) preparing an alpha-alumina crystal by (i) cooling the crystallized cake to room temperature, (ii) removing the aqueous flux by dissolving in water and filtering the crystallized cake, (iii) dispersing the filtrate in 0.1-30% sulfuric acid solution at 20-90° C., and (iv) filtrating, washing and drying; and
(g) forming a coating layer on the surface of the alpha-alumina crystal by adding an acid to aqueous suspension of the alpha-alumina crystal to adjust the pH to 1.0-3.0 and by adding 30-60 weight parts of a metal or a metal precursor and 30-65 weight parts of an alkaline aqueous solution relative to 100 weight parts of the alpha-alumina crystal, followed by calcination.

2. The process of claim 1, wherein the aluminum precursor is selected from the group consisting of an acid salt, a halide and an oxide of aluminum and the zinc precursor is selected from the group consisting of an acid salt, a halide and an oxide of zinc.

3. The process of claim 1, wherein the aqueous flux is selected from the group consisting of sodium sulfate, potassium sulfate, potassium hydrogen sulfate, sodium borate, potassium nitrate and potassium hydroxide.

4. The process of claim 1, wherein the aqueous flux is used in the amount of 80-120 weight parts relative to 100 weight parts of the aluminum precursor.

5. The process of claim 1, wherein the sodium salt is at least one selected from the group consisting of sodium carbonate, sodium bicarbonate, sodium hydroxide and sodium phosphate.

6. The process of claim 1, wherein the metal or metal precursor is selected from the group consisting of a metal selected from the group consisting of gold, silver, copper, titanium, tin and iron; an acid salt of the metal; a halide of the metal; and an oxide of the metal.

* * * * *